(No Model.)

J. J. WOOD.
COMMUTATOR FOR DYNAMO ELECTRIC MACHINES.

No. 591,203.  Patented Oct. 5, 1897.

WITNESSES:
Fred White
Thomas F. Wallace

INVENTOR:
James J. Wood,
By his Attorneys,

UNITED STATES PATENT OFFICE.

JAMES J. WOOD, OF FORT WAYNE, INDIANA.

COMMUTATOR FOR DYNAMO-ELECTRIC MACHINES.

SPECIFICATION forming part of Letters Patent No. 591,203, dated October 5, 1897.

Application filed April 29, 1897. Serial No. 634,355. (No model.)

*To all whom it may concern:*

Be it known that I, JAMES J. WOOD, a citizen of the United States, residing in Fort Wayne, in the county of Allen and State of Indiana, have invented certain new and useful Improvements in Commutators for Dynamo-Electric Machines, of which the following is a specification.

This invention relates to commutators for dynamo-electric machines or electromotors, being especially designed for those of large diameter, where it is desirable to fasten the commutator-segments in such manner that several segments may be removed for repair without interfering with the remainder. For this purpose the segment ends are overlapped by flanged rings which are divided segmentally and each segment thereof is separately fastened to the spider by means of a screw or bolt arranged radially, so that it draws the clamping-ring segment in a direct line toward the axis of rotation. To take the end thrust, a fixed flange is formed on the inner end of the spider and a removable flange on the outer end.

Figure 1:
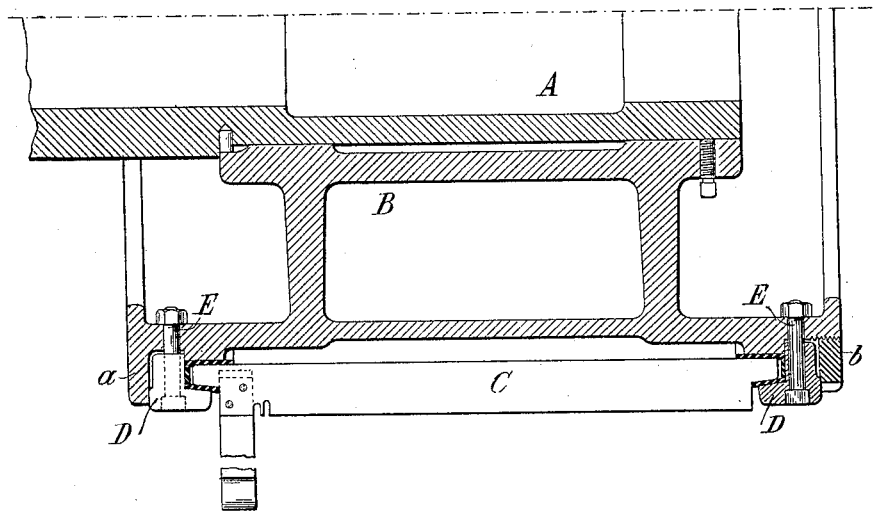
Figure 2:
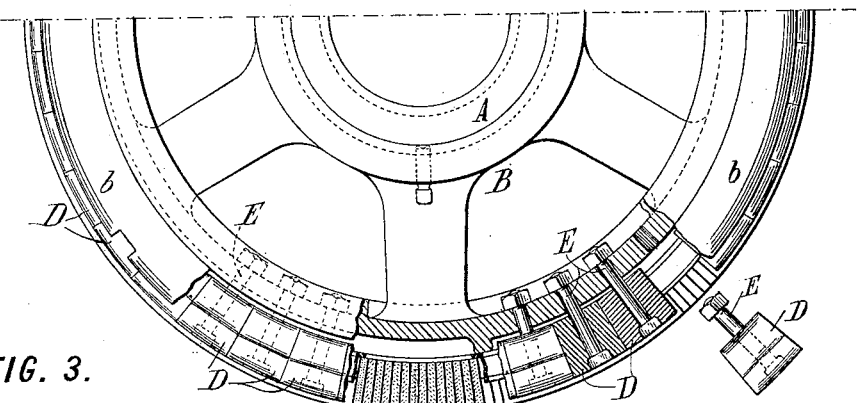
Figure 3:
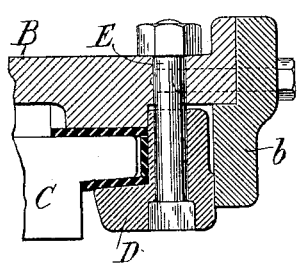
Figure 4:
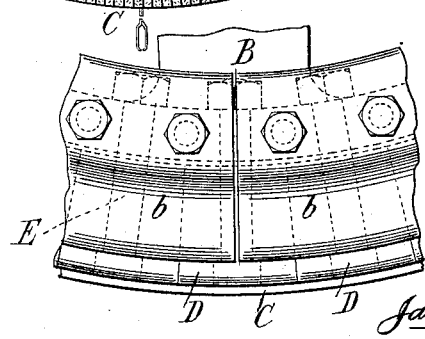

Figure 1 of the accompanying drawings is a diametrical section of one-half of the spider. Fig. 2 is an end elevation thereof, broken away in different planes to show the construction in section. Figs. 3 and 4 are fragmentary views answering to parts of Figs. 1 and 2, respectively, and showing a modified construction.

Let A designate a portion of the armature hub or sleeve, and B the commutator spider or drum, which is fastened thereon, being in general of usual construction. Its outer cylindrical portion is enlarged at opposite ends to form seats for the ends of the commutator-segments C. The segment ends are made nearly parallel and are clamped to the drum by clamping-rings D D, which have a flange overlapping the segment ends and which are divided segmentally, and each segmental ring is provided with a fastening screw or bolt E. These screws are arranged radially, passing through the outer shell of the spider or drum and through the segment of the clamping-ring, being preferably constructed with heads embedded in these clamping-ring segments and with nuts screwing on their threaded ends inside the shell of the spider. By this construction the bolts are arranged directly in the line of strain, so that their pressure is applied in a direct manner to draw the segments to their seats and without involving any movement in longitudinal direction or parallel with the axis of rotation, being thereby an improvement upon the arrangements heretofore devised, in which the fastening-screws are arranged parallel with the axis of rotation and act through wedges or inclined planes to clamp the segments. The end thrust is taken up by means of a flange *a*, cast integrally with the spider at the inner end, and a separable flange *b* at the outer end of the spider. The latter may be differently constructed, the construction shown in Figs. 1 and 2 being best adapted for a commutator of medium size, while that shown in Figs. 3 and 4 is preferable when the commutator is very large.

In Figs. 1 and 2 the flange *b* is made as a ring which screws upon the outer end of the spider, screwing tight against the segmental clamping-ring.

In Figs. 3 and 4 the outer ring *b* is segmental, and its segments are fastened by screws against the end of the spider.

My improved construction attains the greatest simplicity and avoids any sliding of the clamps upon the insulation between them and the segment ends.

It will be observed that according to my construction the commutator-segments are drawn to their seats independently at opposite ends and by a direct movement in radial direction, unaccompanied by any longitudinal displacement of the segments. In this respect my improved construction constitutes an important improvement upon those constructions heretofore adopted, wherein the segments are confined at one end by being thrust under an overhanging flange on the spider and are drawn down at the opposite end by clamping-ring segments. In all such constructions, in order to tighten the segments at the end where it passes under the overhanging flange it is necessary to bevel the segment ends to an angle of approximately forty-five degrees, so that by the tightening of the segmental ring the segments shall be thrust endwise to force their beveled ends under the overhanging ring.

This construction is applicable for small commutators, but is disadvantageous for large ones, where the segments are subject to considerable change in length by reason of expansion and contraction. In such commutators the segments in contracting are liable to become loose and in expanding are liable to buckle. In my construction this is prevented by forming the segment ends with substantially parallel clamping portions instead of beveling them off at an angle, so that the segments can expand or contract by a slight movement of their clamping portions against the layer of insulation which intervenes between these portions and the end seats and clamping-ring segments. This construction of course necessitates that in order to tightly clamp both ends of each segment there shall be segmental clamping-rings applied to both ends instead of only to one.

I claim as my invention the following-defined novel features, substantially as hereinbefore specified, namely:

1. In a commutator, the combination with the spider and segments the latter having substantially parallel clamping portions at opposite ends, of two segmental clamping-rings overhanging the opposite clamping ends of the segments, and radial screws or bolts for drawing the segmental clamping-rings against the segment ends.

2. In a commutator, the combination with the spider and segments of a segmental clamping-ring overhanging the segment ends, and radial screws or bolts engaging the spider and the segments of the clamping-ring for drawing the latter against the segment ends, and a removable flange fastened to the outer end of the spider against said segmental ring for taking the end thrust.

In witness whereof I have hereunto signed my name in the presence of two subscribing witnesses.

JAMES J. WOOD.

Witnesses:
ARTHUR H. DOUGALL,
CHARLES C. MILLER.